United States Patent
Lee et al.

(10) Patent No.: US 11,070,915 B2
(45) Date of Patent: Jul. 20, 2021

(54) VEHICLE AND AUDIO PROCESSING METHOD FOR THE SAME

(71) Applicants: Hyundai Motor Company, Seoul (KR); Kia Motors Corporation, Seoul (KR)

(72) Inventors: Sang Heun Lee, Seoul (KR); Joo Young Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/693,247

(22) Filed: Nov. 23, 2019

(65) Prior Publication Data
US 2020/0221226 A1    Jul. 9, 2020

(30) Foreign Application Priority Data
Jan. 3, 2019    (KR) .................. 10-2019-0000650

(51) Int. Cl.
*H04R 3/04*    (2006.01)
*B60R 11/02*    (2006.01)
*H04W 4/20*    (2018.01)

(52) U.S. Cl.
CPC ............ *H04R 3/04* (2013.01); *B60R 11/0217* (2013.01); *B60R 11/0264* (2013.01); *H04W 4/20* (2013.01); *H04R 2430/01* (2013.01); *H04R 2499/13* (2013.01)

(58) Field of Classification Search
CPC .. H04R 3/04; H04R 2430/01; H04R 2499/13; H04W 4/20; B60R 11/0217; B60R 11/0264
See application file for complete search history.

(56) References Cited

U.S. PATENT DOCUMENTS

| | | | | |
|---|---|---|---|---|
| 2003/0092413 | A1* | 5/2003 | Ito .................... | H04B 1/082 455/234.1 |
| 2004/0110522 | A1* | 6/2004 | Howard ............. | H03J 1/0066 455/512 |
| 2019/0179600 | A1* | 6/2019 | An .................... | H04N 21/4221 |

FOREIGN PATENT DOCUMENTS

| | | | |
|---|---|---|---|
| CN | 203840326 | * | 9/2014 |
| DE | 102011113133 | * | 3/2013 |

* cited by examiner

*Primary Examiner* — Regina N Holder
(74) *Attorney, Agent, or Firm* — Mintz Levin Cohn Ferris Glovsky and Popeo, P.C.; Peter F. Corless

(57) ABSTRACT

A vehicle and an audio processing method for the same are provided to allow a sound level output through a speaker to be maintained at a preset sound level by adjusting a volume of a power amplifier to a constant value based on modulation information of a received broadcast signal. The audio processing method includes receiving a broadcast signal and obtaining modulation information of the broadcast signal and determining volume information of the broadcast signal based on the modulation information. A volume of a power amplifier is adjusted based on the determined volume information to adjust an output sound level of the broadcast signal to correspond to a preset output sound level.

16 Claims, 5 Drawing Sheets

FIG. 4

| CARRIER WAVE (ex, 95.1MHz) | Carrier wave (a) | FMBAND SIGNAL WITH CONSTANT AMPLITUDE AND CONSTANT FREQUENCY |
|---|---|---|
| AUDIO SIGNAL (ex, VOICE, MUSIC) | Audio signal (b) | BROADCAST CONTENTS INCLUDING CONTENT, SUCH AS INFORMATION, MESSAGE, MUSIC, ETC |
| FM MODULATION WAVE | Frequency modulatesd (c) | MODULATION OF FREQUENCY IN PROPORTION TO MAGNITUDE OF SIGNAL →VARIATION IN MODULATION RATE ACCORDING TO TYPE (MAGNITUDE) OF AUDIO SIGNAL |

VEHICLE AND AUDIO PROCESSING METHOD FOR THE SAME

CROSS-REFERENCE TO RELATED APPLICATION

This application is based on and claims priority under 35 U.S.C. § 119 to Korean Patent Application No. 10-2019-0000650, filed on Jan. 3, 2019, the disclosure of which is incorporated herein by reference.

BACKGROUND

1. Field

The present invention relates to a vehicle, and more specifically, to audio signal processing for the same.

2. Description of the Related Art

A vehicle is provided with a head unit that is configured to receive and output a radio broadcast signal or a television broadcast signal. Both the radio broadcast signal and the television broadcast signal include an audio signal, and the listener (e.g., the occupant) sets the output sound level of audio using a volume setting value suitable for the listener.

However, in the audio signal of the broadcast signal, the volume may be set to varying values based on the broadcast type. For example, an 'A broadcast' outputs a sound level of 80 dB at a volume setting value of 25, while a 'B broadcast' outputs a sound level of 70 dB at the same volume setting value of 25. In particular, for a listener having been listening to the 'A broadcast' listens to the 'B broadcast' with the same sound level of 80 dB, the listener needs to adjust the volume setting value to be higher than 25. In other words, there is a hassle to manipulate the volume setting in listening to different broadcasts.

SUMMARY

Therefore, it is an object of the present disclosure to provide a vehicle allowing a sound level output through a speaker to be maintained at a preset sound level by adjusting a volume of a power amplifier to a constant value based on modulation information of a received broadcast signal, and an audio processing method for the same. Additional aspects of the invention will be set forth in part in the description which follows and, in part, will be obvious from the description, or may be learned by practice of the invention.

Therefore, it is an aspect of the present invention to provide an audio processing method for a vehicle that may include: receiving a broadcast signal and obtain modulation information regarding the broadcast signal; determining volume information regarding the broadcast signal based on the modulation information; and adjusting a volume of a power amplifier based on the determined volume information such that an output sound level of the broadcast signal corresponds to a preset output sound level.

The modulation information may be obtained through classification of a transmission region, a broadcasting station, a broadcast title, and a broadcast content, of the broadcast signal. In particular, the modification information may include at least one of a modulation index and a frequency deviation that are distinguished by each of the transmission region, the broadcasting station, the broadcast title, and the broadcast content, of the broadcast signal. The broadcast content may be divided into a speech dominant content and a music dominant content. The adjusting of the volume of the power amplifier may include allowing the broadcast signal to be output at a sound level that corresponds to a preset volume setting value.

It is another aspect of the present invention to provide a vehicle that may include: a tuner configured to receive a broadcast signal through an antenna; a signal processor configured to obtain modulation information regarding the broadcast signal; a power amplifier configured to output an audio signal based on a preset volume; and a controller configured to determine volume information regarding the broadcast signal based on the modulation information; and adjusting a volume of the power amplifier based on the determined volume information such that an output sound level of the broadcast signal corresponds to a preset output sound level.

The modulation information may be obtained through classification of a transmission region, a broadcasting station, a broadcast title, and a broadcast content, of the broadcast signal. In particular, the modification information may include at least one of a modulation index and a frequency deviation that are distinguished by each of the transmission region, the broadcasting station, the broadcast title, and the broadcast content, of the broadcast signal. The broadcast content may be divided into a speech dominant content and a music dominant content. The adjusting of the volume of the power amplifier may include allowing the broadcast signal to be output at a sound level that corresponds to a preset volume setting value.

It is another aspect of the present invention to provide an audio processing method for a vehicle that may include: receiving a broadcast signal and obtaining at least one of a modulation index and a frequency deviation of the broadcast signal; determining volume information regarding the broadcast signal based on the at least one of the modulation index and the frequency deviation of the broadcast signal; and adjusting a volume of a power amplifier based on the determined volume information such that an output sound level of the broadcast signal corresponds to a preset volume setting value.

The at least one of the modulation index and the frequency deviation of the broadcast signal may be obtained through classification of a transmission region, a broadcasting station signal, a broadcast title, and a broadcast content, of the broadcast signal. The broadcast content may be divided into a speech dominant content and a music dominant content.

It is another aspect of the present invention to provide a vehicle that may include: a tuner configured to receive a broadcast signal through an antenna; a signal processor configured to obtain at least one of a modulation index and a frequency deviation of the broadcast signal; a power amplifier configured to output an audio signal according to a set volume; and a controller configured to determine volume information of the broadcast signal based on the at least one of the modulation index and the frequency deviation of the broadcast signal; and adjusting the volume of the power amplifier based on the determined volume information such that an output sound level of the broadcast signal corresponds to a preset volume setting value.

The at least one of the modulation index and the frequency deviation of the broadcast signal may be obtained through classification of a transmission region, a broadcasting station, a broadcast title, and a broadcast content, of the broadcast signal. The broadcast content may be divided into a speech dominant content and a music dominant content.

BRIEF DESCRIPTION OF THE DRAWINGS

These and/or other aspects of the invention will become apparent and more readily appreciated from the following description of the exemplary embodiments, taken in conjunction with the accompanying drawings of which:

FIG. 4 is a diagram for describing the reason for the modulation index varying according to the content of the broadcast according to an exemplary embodiment of the present invention.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
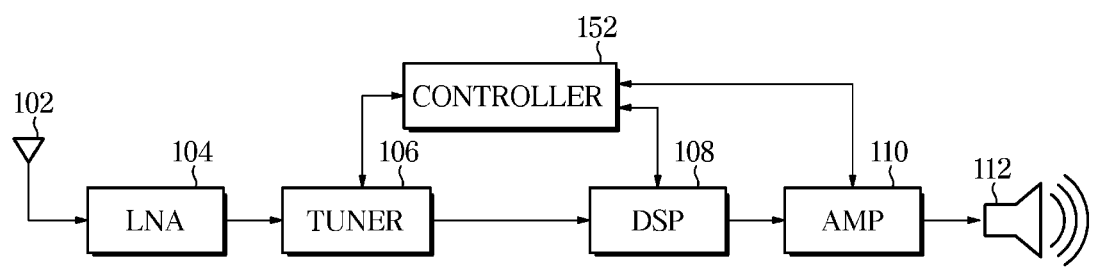
FIG. 1 is a block diagram illustrating a broadcast receiving apparatus of a vehicle according to an exemplary embodiment of the present invention.

FIG. 1 is a block diagram illustrating a broadcast receiving apparatus of a vehicle according to an exemplary embodiment of the present invention.

The broadcast receiving apparatus shown in FIG. 1 may be configured to receive a radio broadcast signal or a television broadcast signal through an antenna 102, perform signal processing on the received signal, and output the processed signal through a speaker 112. To perform signal processing on the received broadcast signal, a low noise amplifier (LNA) 104, a tuner 106, a digital signal processor (DSP) 108, and a power amplifier 110 may be used. A controller 152 may be configured to operate the tuner 106, the DSP 108, and the power amplifier 110 such that the broadcast signal received through the antenna 102 is output more smoothly through the speaker 112. The DSP 108 may include an analog signal processing unit provided to process an analog signal.

The LNA 104 is a device configured to amplify a relatively weak signal received through the antenna 102. The LNA 104 may be disposed adjacent to the antenna 102 or may be embedded in the antenna 102, to reduce attenuation in a transmission line. The tuner 106 may be configured to resonate at a certain frequency of a radio wave (or an electric signal) to select only the radio wave. For example, the tuner 106 may be configured to select only a signal having a frequency that corresponds to a specific broadcast among a plurality of broadcast signals received through the antenna 102. When a listener (e.g., an occupant) selects a specific broadcast via the head unit of the vehicle, the selection of the listener may be transmitted to the tuner 106 through the controller 152. The tuner 106 may be configured to select only a signal having a frequency that corresponds to the broadcast selected by the listener, and transmit the selected signal to the DSP 108 at the subsequent stage.

The DSP 108 may be configured to perform digital signal processing on the received broadcast signal and transmit the processed signal to the power amplifier 110 at the subsequent stage. The digital signal processing of the DSP 108 may include a process of converting the received analog broadcast signal into a digital broadcast signal. In addition, a variety of information included in the broadcast signal may be obtained through the digital signal processing by the DSP 108. For example, through the digital signal processing, information, such as a transmission country of the broadcast signal, a broadcasting station of the broadcast signal, a broadcast title (a program title) of the broadcast signal, and a type (a form) of a content of the broadcast signal, may be obtained. In addition, through the digital signal processing by the DSP 108, modulation information of the broadcast may be obtained. The modulation information may include at least one of a modulation index and a frequency deviation. In particular, the frequency deviation may represent a maximum frequency deviation.

The controller 152 may be configured to adjust the volume of the power amplifier 110 to a constant value based on the modulation information of the received broadcast signal (e.g., at least one of the modulation index and the maximum frequency deviation) such that the sound level output through the speaker 112 is maintained at a preset sound level. Particularly, the 'preset sound level' may be a sound level based on a volume setting value set in an audio device (or a video device) of a vehicle to which the present invention is applied. When the occupant (e.g., the listener) of the vehicle to which the present invention is applied has set the audio device (or the video device) of the vehicle to generate an output of about 80 dB at a volume setting value of 25, the controller 152 may be configured to adjust the volume of the power amplifier 110 to generate an output of about 80 dB at a volume setting value of about 25 even when receiving another broadcast having a different volume setting value and a output (dB) corresponding thereto.

The controller 152 may be configured to allow the sound level output through the speaker 112 to be maintained at a preset sound level since a radio broadcast or a television broadcast has a varying sound level based on the broadcast, which causes a difference in sound level output through the speaker 112, and thus, the listener may feel discomfort. For example, a 'A broadcast' outputs a sound level of about 80 dB at a volume setting value of about 25 while a 'B broadcast' outputs a lower sound level of about 70 dB at the same volume setting value of about 25. In particular, the listener having been listening to the 'A broadcast' may listen to the 'B broadcast' with the same sound level as that in the 'A broadcast' only by adjusting the volume setting value to be higher than about 25. In other words, there is a hassle to manipulate the volume setting in listening to different broadcasts.

According to the exemplary embodiment of the present invention, even when a listener having been listening to the 'A broadcast' having a sound level of about 80 dB at a volume setting value of about 25 switches to the 'B broadcast', having a lower sound level of about 70 dB at a volume setting value of about 25, the controller 152 may be configured to operate the power amplifier 110 such that the listener listens to the 'B broadcast' with the same sound level of about 80 dB at a volume setting value about 25. Accordingly, the listener may listen to both of the 'A broadcast' and the 'B broadcast' at a constant sound level without needing to adjust the volume setting value.

The reasons that the output sound level of audio of a received broadcast varies is as follows.

Difference by Region (Country)

The modulation index and the maximum frequency deviation of a broadcast signal may be different for each country. The modulation index of an AM signal is a value obtained by dividing 'the magnitude of the maximum amplitude of an original information signal' by 'the magnitude of the maximum amplitude of a carrier wave'. The modulation index of an FM signal is the value obtained by dividing 'the maximum frequency deviation' by 'a modulation frequency'.

When the modulation index is excessively large, signal distortion may occur or interference with adjacent frequencies may occur. Conversely, when the modulation index is excessively small, the signal may be weak and thus the volume is reduced. Accordingly, the modulation index may be set to be suitable for the broadcast, which however may result in a difference in modulation index for each broadcast, and thus the output sound level may not be uniform between broadcasts.

Figure 2:
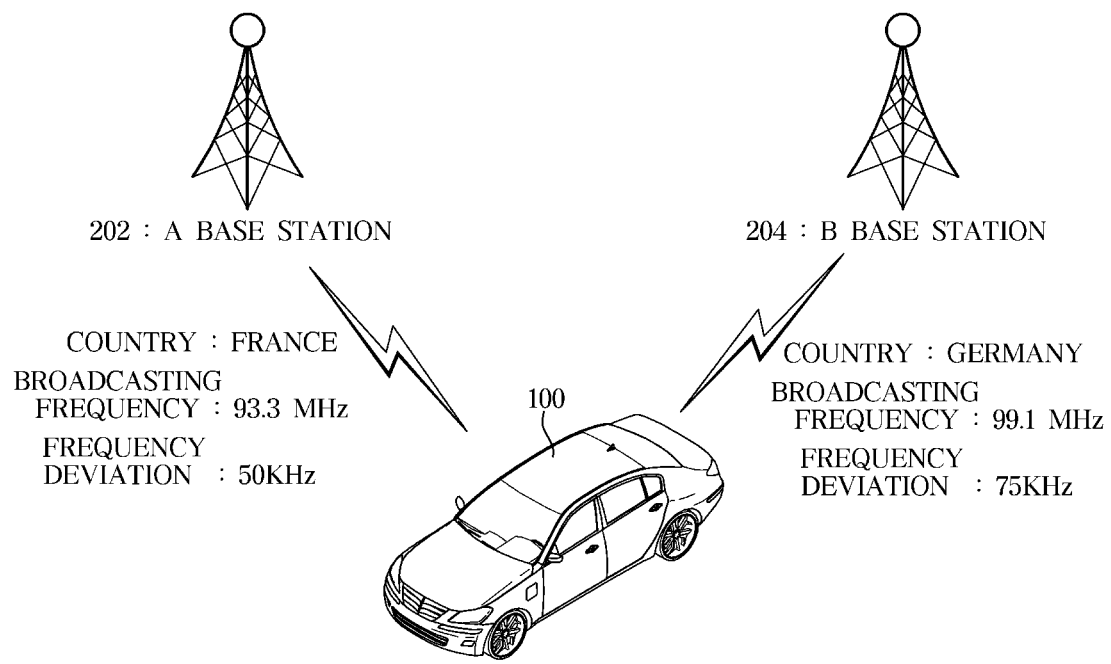
FIG. 2 is a diagram illustrating a broadcasting frequency and a frequency deviation for each country according to an exemplary embodiment of the present invention.

FIG. 2 is a diagram illustrating a broadcasting frequency and a frequency deviation for each country. Referring to FIG. 2, in France, a 93.3 MHz FM broadcast has a frequency deviation of 50 KHz. On the other hand, in Germany, a 99.1 MHz FM broadcast has a frequency deviation of 75 MHz. For reference, the FM broadcast in Korea has the same frequency deviation as that of Germany, of 75 KHz, while the FM broadcast in United Kingdom, has a frequency deviation of 100 KHz, which is different from other European countries, such as France and Germany. Since the frequency deviation varies from country to country, even at the same volume setting value of the broadcast receiving apparatus, the sound level actually output may vary due to the difference in frequency deviation between broadcasts of countries.

According to the exemplary embodiment of the present invention, a plurality of country-specific setting values based on the frequency deviation for each country may be provided in the power amplifier 110, and when receiving a specific country, a setting value corresponding to the country may be used such that the power amplifier 110 employs a different degree of amplification, thereby allowing the sound level output through the speaker 112 to be maintained constant. The country-specific setting value based on the frequency deviation for each country may be determined such that the result of the amplification of the power amplifier 110 always has a constant value even at a different frequency deviation.

For example, when a vehicle made by France receives a German broadcast, the volume (the rate of amplification) of the power amplifier 110 may be adjusted by about 25 MHz, which is the difference between the frequency deviation of about 75 MHz of the French broadcast and the frequency deviation of about 50 MHz of the German broadcast such that the German broadcast is output with the same sound level as that of the France broadcast. Accordingly, the listener may always listen to the broadcast with a constant sound level without needing to adjust the audio volume when receiving the French or German broadcast.

Difference by Broadcast Form (Type)

Figures 3A, 3B:
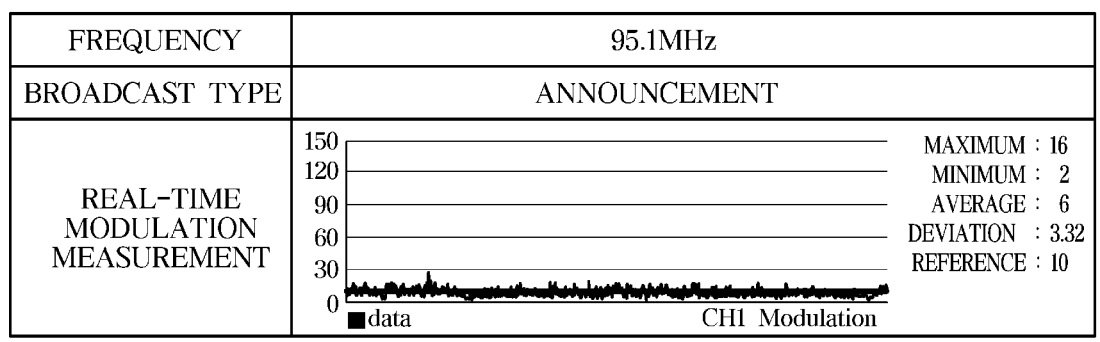
FIGS. 3A-3B are diagrams illustrating the difference in modulation index according to the form (type) of the content of the broadcast according to an exemplary embodiment of the present invention.

The modulation index may be different based on the modulation index (speech/music) of the broadcast signal for each form (each type) of the broadcast content. FIGS. 3A-3B are diagrams illustrating the difference in modulation index according to the form (type) of the content of the broadcast. Referring to FIG. 3A, when the broadcast content is mainly composed of speech (e.g., an announcement), the modulation index measured in real time has a maximum of about 16, a minimum of about 2, an average of about 6, and a deviation of about 3.32. On the contrary, referring to FIG. 3B, when the broadcast content is mainly composed of music, the modulation index measured in real time has a maximum of about 61, a minimum of about 22, an average of about 41, and a deviation of about 7.81.

As described above, the average of the modulation index for the broadcast content mainly composed of speech (see FIG. 3A) is about 6 and the average of the modulation index for the broadcast content mainly composed of music (see FIG. 3B) is about 41, showing a substantial difference therebetween. Accordingly, when a speech-dominant broadcast and a music-dominant broadcast are output at the same volume setting value, a great difference in output sound level arises, which may cause the listener to feel discomfort.

FIG. 4 is a diagram for describing the reason for the modulation index varying according to the content of the broadcast. Referring to FIG. 4, a carrier wave is an FM band signal having a constant amplitude and a constant frequency, in which a data signal of a speech dominant content or music content according to a broadcast content is included and transmitted. In particular, the data signal may be transmitted in the carrier wave while maintaining the amplitude constant but changing the frequency in proportion to the magnitude of the data signal (modulation). In other words, the modulation rate (the modulation index) varies according to the magnitude of the data signal. Since music has a magnitude greater than that of a speech, such as announcement, the modulation index of a music-dominant broadcast may be significantly larger than that of a speech-dominant broadcast.

To remove the non-uniformity in output sound level caused by the difference in modulation index, according to the exemplary embodiment of the present invention, the DSP 108 may be configured to obtain information regarding a modulation index or a frequency deviation of a broadcast, and the power amplifier 110 may be configured to employ a different degree of amplification based on the information regarding the modulation index or frequency deviation of the broadcast, thereby allowing the sound level output through the speaker 112 to be maintained constant. For example, by using RDS information included in a broadcast signal or referring to broadcast information DB (e.g., region (country)/broadcasting station/content) containing different modulation indexes by the regions (countries)/broadcast stations/contents, a different degree of amplification may be used for the power amplifier 110, allowing the sound level output through the speaker 112 to be maintained constant.

Figure 5:
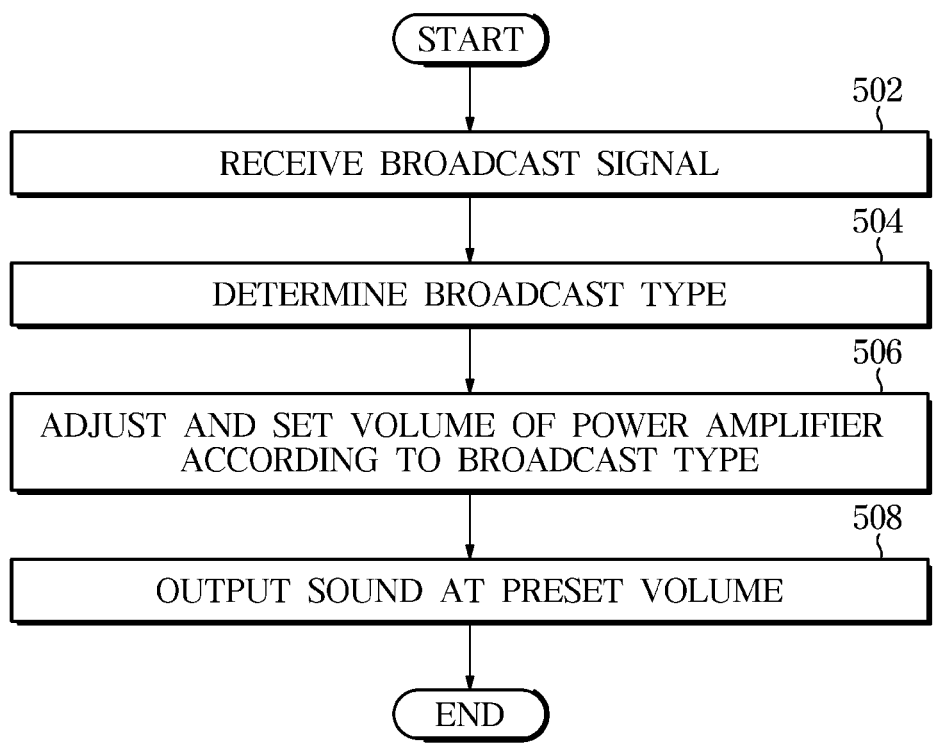
FIG. 5 is a flowchart showing a method of receiving a broadcast of a vehicle according to an exemplary embodiment of the present invention.

FIG. 5 is a flowchart showing a method of receiving a broadcast of a vehicle according to an exemplary embodiment of the present invention. The method of receiving a broadcast of a vehicle shown in FIG. 5 allows the power amplifier 110 to employ a different degree of amplification by referring to different modulation indexes according to the broadcast types (e.g., the region (country)/broadcasting station/content), and thus, the sound level output through the speaker 112 may be maintained constant.

Referring to FIG. 5, the controller 152 may be configured to operate the tuner 106 to receive a broadcast signal having a frequency selected by the listener such that the broadcast signal of the corresponding broadcast is received (502). The received broadcast signal may be subjected to digital signal processing by the DSB 108. Through the digital signal processing of the DSP 108, information, such as a transmission country of the broadcast signal, a broadcasting station of the broadcast signal, a broadcast title (a program title), and a type (a form) of a content, of the broadcast signal, may be obtained, particularly, information regarding a modulation index and a maximum frequency deviation of the corresponding broadcast may be obtained.

The controller 152 may be configured to determine the broadcast type of the broadcast from the information obtained during the digital signal processing of the received broadcast (504). The determining of the broadcast type may include the classification of the modulation index and the maximum frequency deviation together with the classification of the transmission region (country) of the broadcast, the broadcasting station of the broadcast, the broadcast title of the broadcast, and the form (type) of the content of the broadcast. Such a classification of the broadcast type may be provided to adjust the volume of the power amplifier 110 according to the broadcast type by obtaining the information regarding the modulation index and the maximum frequency deviation of the broadcast.

The controller 152 may be configured to adjust and set the volume of the power amplifier 110 based on the determined broadcast type (506). In other words, to remove the non-uniformity in sound level between broadcasts due to a difference in modulation index and frequency deviation between broadcasts, the controller 152 may be configured to adjust the power amplifier 110 to have a volume (e.g., an amplification rate) suitable for the modulation index or frequency deviation for each broadcast based on the information regarding the modulation index or frequency deviation of the corresponding broadcast.

As the volume of the power amplifier 110 is adjusted, the speaker 112 may be configured to output sound at a preset volume (508). In other words, even when the modulation index or the frequency deviation is different for each broadcast, the broadcast type-specific automatic volume adjustment according to the exemplary embodiment of the present invention allows the listener to always listen to the audio with a constant sound level without requiring a manual adjustment to the volume.

As is apparent from the above, a sound level output through a speaker may be maintained at a preset sound level by adjusting a volume of a power amplifier to a constant value based on modulation information of a received broadcast signal.

The above description of the present disclosure is for illustrative purposes, and a person having ordinary skilled in the art should appreciate that other specific modifications may be easily made without departing from the technical spirit or essential features of the present disclosure. Therefore, the above exemplary embodiments should be regarded as illustrative rather than limitative in all aspects. The scope of the disclosure is not to be limited by the detailed description set forth above, but by the accompanying claims of the present disclosure, and it should also be understood that all changes or modifications derived from the definitions and scope of the claims and their equivalents fall within the scope of the present disclosure.

What is claimed is:

1. An audio processing method for a vehicle, comprising:
   receiving, by a controller, a broadcast signal and obtaining modulation information of the broadcast signal;
   determining, by the controller, volume information of the broadcast signal based on the modulation information of the broadcast signal; and
   adjusting, by the controller, while the broadcast signal is being received, a volume of a power amplifier based on the determined volume information to adjust an output sound level of the broadcast signal to correspond to a preset output sound level of a broadcast receiving apparatus of the vehicle.

2. The audio processing method of claim 1, wherein the modulation information is obtained through classification of a transmission region, a broadcasting station, a broadcast title, and a broadcast content, of the broadcast signal.

3. The audio processing method of claim 2, wherein the modification information includes at least one of the group consisting of: a modulation index and a frequency deviation that are distinguished by each of the transmission region, the broadcasting station, the broadcast title, and the broadcast content, of the broadcast signal.

4. The audio processing method of claim 3, wherein the broadcast content is divided into a speech dominant content and a music dominant content.

5. The audio processing method of claim 1, wherein the adjusting of the volume of the power amplifier includes allowing the broadcast signal to be output at a sound level corresponding to a preset volume setting value.

6. A vehicle, comprising:
a tuner configured to receive a broadcast signal through an antenna;
a signal processor configured to obtain modulation information of the broadcast signal;
a power amplifier configured to output an audio signal according to a preset volume; and
a controller configured to determine volume information of the broadcast signal based on the modulation information; and while the broadcast signal is being received, adjust a volume of the power amplifier based on the determined volume information such that an output sound level of the broadcast signal corresponds to a preset output sound level of a broadcast receiving apparatus of the vehicle.

7. The vehicle of claim 6, wherein the modulation information is obtained through classification of a transmission region, a broadcasting station, a broadcast title, and a broadcast content, of the broadcast signal.

8. The vehicle of claim 7, wherein the modification information includes at least one of the group consisting of: a modulation index and a frequency deviation that are distinguished by each of the transmission region, the broadcasting station, the broadcast title, and the broadcast content, of the broadcast signal.

9. The vehicle of claim 8, wherein the broadcast content is divided into a speech dominant content and a music dominant content.

10. The vehicle of claim 6, wherein the adjusting of the volume of the power amplifier includes allowing the broadcast signal to be output at a sound level corresponding to a preset volume setting value.

11. An audio processing method for a vehicle, comprising:
receiving, by a controller, a broadcast signal and obtaining at least one of a modulation index and a frequency deviation of the broadcast signal;
determining, by the controller, volume information of the broadcast signal based on the at least one of the modulation index and the frequency deviation of the broadcast signal; and
adjusting, by the controller, while the broadcast signal is being received, a volume of a power amplifier based on the determined volume information to adjust an output sound level of the broadcast signal to correspond to a preset volume setting value of a broadcast receiving apparatus of the vehicle.

12. The audio processing method of claim 11, wherein the at least one of the modulation index and the frequency deviation of the broadcast signal is obtained through classification of a transmission region, a broadcasting station signal, a broadcast title, and a broadcast content, of the broadcast signal.

13. The audio processing method of claim 11, wherein the broadcast content is divided into a speech dominant content and a music dominant content.

14. A vehicle, comprising:
a tuner configured to receive a broadcast signal through an antenna;
a signal processor configured to obtain at least one of a modulation index and a frequency deviation of the broadcast signal;
a power amplifier configured to output an audio signal according to a set volume; and
a controller configured to determine volume information of the broadcast signal based on the at least one of the modulation index and the frequency deviation of the broadcast signal; and while the broadcast signal is being received, adjust the volume of the power amplifier based on the determined volume information such that an output sound level of the broadcast signal corresponds to a preset volume setting value of a broadcast receiving apparatus of the vehicle.

15. The vehicle of claim 14, wherein the at least one of the modulation index and the frequency deviation of the broadcast signal is obtained through classification of a transmission region, a broadcasting station, a broadcast title, and a broadcast content, of the broadcast signal.

16. The vehicle of claim 15, wherein the broadcast content is divided into a speech dominant content and a music dominant content.

* * * * *